United States Patent
Lawes

(10) Patent No.: US 9,242,704 B2
(45) Date of Patent: Jan. 26, 2016

(54) FLOATING CANAL SYSTEM FOR SEAS WITH TENDENCY TO FREEZE

(71) Applicant: Roland Lawes, Santiago (PA)

(72) Inventor: Roland Lawes, Santiago (PA)

( * ) Notice: Subject to any disclaimer, the term of this patent is extended or adjusted under 35 U.S.C. 154(b) by 0 days.

(21) Appl. No.: 14/300,001

(22) Filed: Jun. 9, 2014

(65) Prior Publication Data

US 2015/0353169 A1    Dec. 10, 2015

(51) Int. Cl.
*B63B 35/08* (2006.01)

(52) U.S. Cl.
CPC ...................... *B63B 35/08* (2013.01)

(58) Field of Classification Search
CPC ................ B63C 1/02; E02C 5/00; E02C 1/04
USPC .................. 405/84–86; 114/44–48
See application file for complete search history.

(56) References Cited

U.S. PATENT DOCUMENTS

| | | | | | |
|---|---|---|---|---|---|
| 1,413,603 | A | * | 4/1922 | Muller | 114/45 |
| 1,513,591 | A | * | 10/1924 | Wilhelm et al. | 114/261 |
| 1,795,398 | A | * | 3/1931 | Huguenin | 405/86 |
| 2,728,319 | A | * | 12/1955 | Engstrand | 114/46 |
| 2,732,818 | A | * | 1/1956 | Quirin | 114/46 |
| 3,972,199 | A | * | 8/1976 | Hudson et al. | 405/217 |
| 5,215,024 | A | * | 6/1993 | McAllister | 114/45 |
| 6,979,149 | B1 | * | 12/2005 | Thompson | 405/86 |

* cited by examiner

*Primary Examiner* — Tara M. Pinnock
(74) *Attorney, Agent, or Firm* — Clifford Kraft

(57) ABSTRACT

A system of floating canal sections that connect end-to-end along a route to form a shipping canal and contain brine to prevent freezing. The canal sections of the present invention resemble floating dry-docks that are filled with the brine solution rather than with normal sea water. Sections can be floated into place and connected. Sections can be anchored to the sea floor. A typical section can be around 1000 feet long, 150 feet wide and about 50 feet deep. The sections can be manufactured anywhere and towed to the Arctic and connected. The use of brine prevents pollution if there should be a leak.

18 Claims, 3 Drawing Sheets

FLOATING CANAL SYSTEM FOR SEAS WITH TENDENCY TO FREEZE

BACKGROUND

1. Field of the Invention

The present invention is related to shipping canals and more particularly to a floating canal system that can be used to create a shipping canal in waters that tend to freeze.

2. Description of the Problem

Scientists agree that arctic ice is melting probably because of global warming. Arctic ice is expected to recede enough that it may be possible within the next 100 years to create a shipping canal across the infamous northwest passage that runs typically from the Atlantic Ocean up the coast of Greenland, between the northern islands of Canada, and out along the northern Canadian cost to the Bearing Straits and into the Pacific Ocean. The number of nautical miles between Asia and Europe going through the Panama Canal is around 12,600, while it is only 7,900 miles along the Northwest Passage. The Northwest Passage route is also around 5000 miles shorter than a proposed new canal across Nicaragua.

However, fifty to one hundred years is a long time, and the world needs a new ocean-to-ocean shipping route much sooner than that. One reason for this is that the present Panama Canal is too narrow to handle many modern ships. Panama has engaged in some activities and contracts to widen the Panama Canal; however, this may or may not happen very soon. In any case, it will be a very expensive and prolonged project, as would be a canal across Nicaragua. What is badly needed is a system that would allow opening of the Northwest Passage immediately that could be implemented with minimal costs.

SUMMARY OF THE INVENTION

The present invention relates to a system of floating canal sections that connect end-to-end along the route and contain brine. Each section can be anchored to the sea floor. While Arctic sea water contains salt, the concentration is not enough to prevent freezing at Arctic temperatures. However, brine with a concentration of around 22-23% salt will resist freezing at Arctic winter temperatures, and will not freeze at Arctic summer temperatures. The canal sections of the present invention resemble floating dry-docks that are filled with the brine solution rather than with normal sea water. Sections can be floated into place and connected. A typical section can be around 1000 feet long, 150 feet wide and about 50 feet deep. The sections can be manufactured anywhere and towed to the Arctic and connected. The use of brine prevents pollution if there should be a leak.

DESCRIPTION OF THE FIGURES

Attention is now directed to several drawings that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

It is well-known that a sodium chloride-water solution becomes saturated at around 28% salt. Brine solution of approximately 22% salt freezes at around −19 degrees C. (or −2.2 degrees F.). While Arctic air temperatures near the North Pole can be as cold as −32 degrees C., winter temperatures along the route of the Northwest Passage seldom reach more than −20 degrees C. Summer air temperatures can be as high as 5 degrees C. along the route. Also, with global warming, more and more ice is melting, and temperatures are rising.

Figure 1:
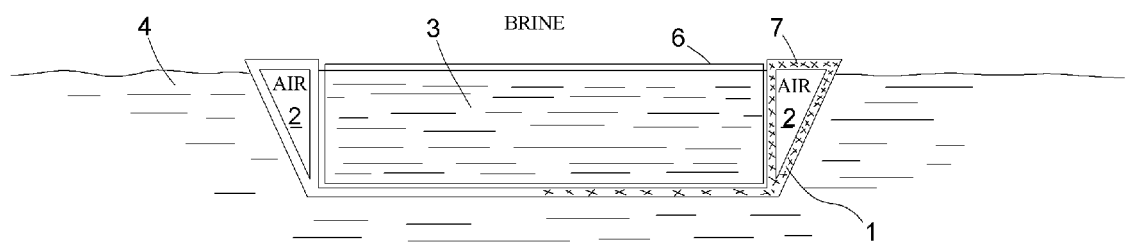
FIG. 1 shows a cross-section of a typical canal section of the present invention.

FIG. 1 shows an embodiment of the present invention in cross-section. A frame 1 made from Ferro-Cement or other material is constructed with ballasts 2 that cause the section to float in sea water. The cost of the individual sections is less than that of a typical eight-lane highway even including the cost of towing and installing the sections. The sections typically have gates 6 at both ends that can be opened to create the canal, and closed to allow the repair or replacement of damaged section. Each section can have expansion seals 7 at both ends to prevent brine leakage. Each section can be filled with the brine solution 3 which is isolated from the sea 4 or ice. Each section is typically anchored to the sea floor. The actual sections can be made to float higher than shown in FIG. 1 or have higher walls to prevent waves and rough seas from spilling into the brine in unfrozen areas (or while being towed if pre-filled with brine). After the canal is in place, the portion of FIG. 1 marked 4 can be ice.

Typical section dimensions can be up to one-thousand feet long, one hundred fifty feet wide and fifty feet deep. While these are possible dimensions, any dimensions may be used and are within the scope of the present invention.

Even if there is some slight surface freezing in the brine during winter, it will be much less than that of the open sea and can easily be controlled by an ice-breaker or even a cargo ship passing through.

Figure 2:
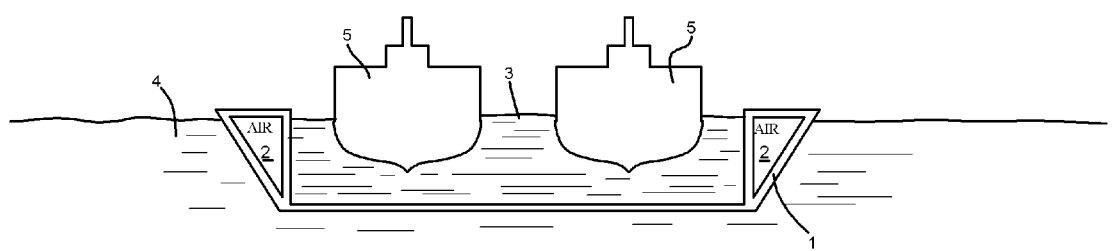
FIG. 2 shows an embodiment with width for two ships.
Figure 3:
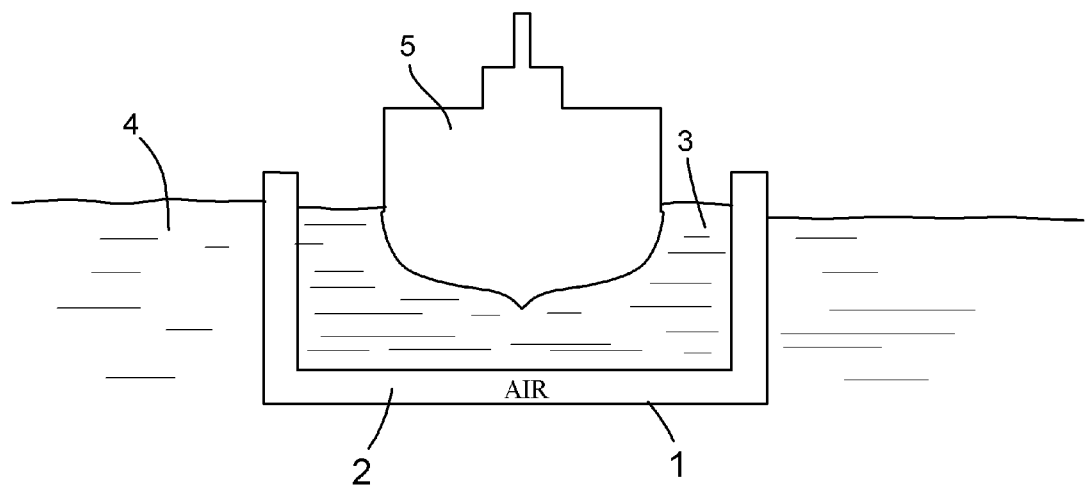
FIG. 3 shows a different embodiment with width for one ship.

FIG. 2 shows the embodiment of FIG. 1 sized to allow passage of two ships 5. FIG. 3 shows an alternate embodiment using a hollow core construction 2 rather than ballasts. FIG. 3 shows only one ship 5; however, this construction can also be sized for multiple ships. Any construction technique that allows the sections to float and have enough stability to be towed is within the scope of the present invention. Typically, the sections 1 can be anchored and joined with expansion seals as previously described.

In some embodiments of the present invention, spare canal sections can be stored on the sea bottom or to the side of the main canal. A cleanup vessel can make periodic trips to skim surface trash as well as to remove any sediment. A cargo spill can be isolated with clean-up costs lower than for conventional waterways.

In a particular embodiment, most sections can be manufactured wide enough to pass one ship with intermediate wider passing sections designed for two ships.

The present invention is an economical way to allow waterways that typically freeze or are frozen such as the Northwest Passage to be used in the near future for commercial ship traffic, in many cases, all year long. The cost of producing brine is comparable to the present costs of dredging and power at the Panama Canal. The brine in each section can be monitored either manually or automatically, and adjusted in concentration as needed.

Several descriptions and illustrations have been presented to aid in understanding the present invention. One with skill in the art will realize that numerous changes and variations may be made without departing from the spirit of the invention. Each of these changes and variations is within the scope of the present invention.

I claim:

1. A canal system comprising:

a plurality of floating canal sections connectable end-to-end, each containing a brine solution of sufficient concentration to prevent freezing down to at least −19 degrees C.;

each canal section adapted to be towed to a location and connected to a previous section to form a continuous passageway;

wherein, when said canal sections are connected end-to-end, they provide a continuous brine, all-year ship channel that resists freezing and allows ship traffic.

2. The canal system of claim 1 wherein each of said canal sections includes ballasts.

3. The canal system of claim 1 wherein each of said canal sections has a gate operable at each end to close off the section to allow replacement or towing.

4. The canal system of claim 1 wherein said canal sections connect together with expansion seals.

5. The canal system of claim 1 wherein said sections are wide enough to allow two ships to pass.

6. The canal system of claim 1 wherein each of said canal sections is anchored to the sea floor.

7. The canal system of claim 1 wherein said canal sections are configured to be towed from a remote location to a canal site.

8. The canal system of claim 1 wherein said canal sections are ferro-cement.

9. The canal system of claim 1 wherein said brine solution contains approximately 22-23% sodium chloride.

10. A method for creating a shipping canal in waters with a tendency to freeze comprising:

providing a plurality of elongated floating canal sections each configured to hold a brine solution of sufficient concentration to prevent freezing down to at least −19 degrees C., and each having a gate at each end;

towing each canal section into position and connecting said canal sections end-to-end to form a shipping canal;

opening said gates;

filling said plurality of canal sections with the brine solution.

11. The method of claim 10 wherein said brine solution is approximately 22-23% salt.

12. The method of claim 10 wherein said canal sections are connected together through expansion seals.

13. The method of claim 10 wherein said canal sections are anchored to the sea floor.

14. The method of claim 10 further comprising storing spare canal sections on the sea floor.

15. An all-year ship canal configured to provide a northwest passage across Arctic seas comprising:

a plurality of floating end-to-end canal sections sealed from ambient sea water containing a brine solution of concentration sufficient to prevent freezing in Arctic seas in winter, each canal section configured with a gate at each end and towed into position, each canal section adapted to be anchored to the sea floor.

16. The all-year ship canal of claim 15 wherein said brine solution contains approximately 22-23% sodium chloride.

17. The all-year ship canal of claim 15 wherein each of said canal sections includes ballasts.

18. The all-year ship canal of claim 15 wherein each of said canal is made from ferro-cement.

* * * * *